Sept. 10, 1957 — L. G. KLOSTERMANN — 2,805,863
SPREADER
Filed Sept. 30, 1954 — 3 Sheets-Sheet 2
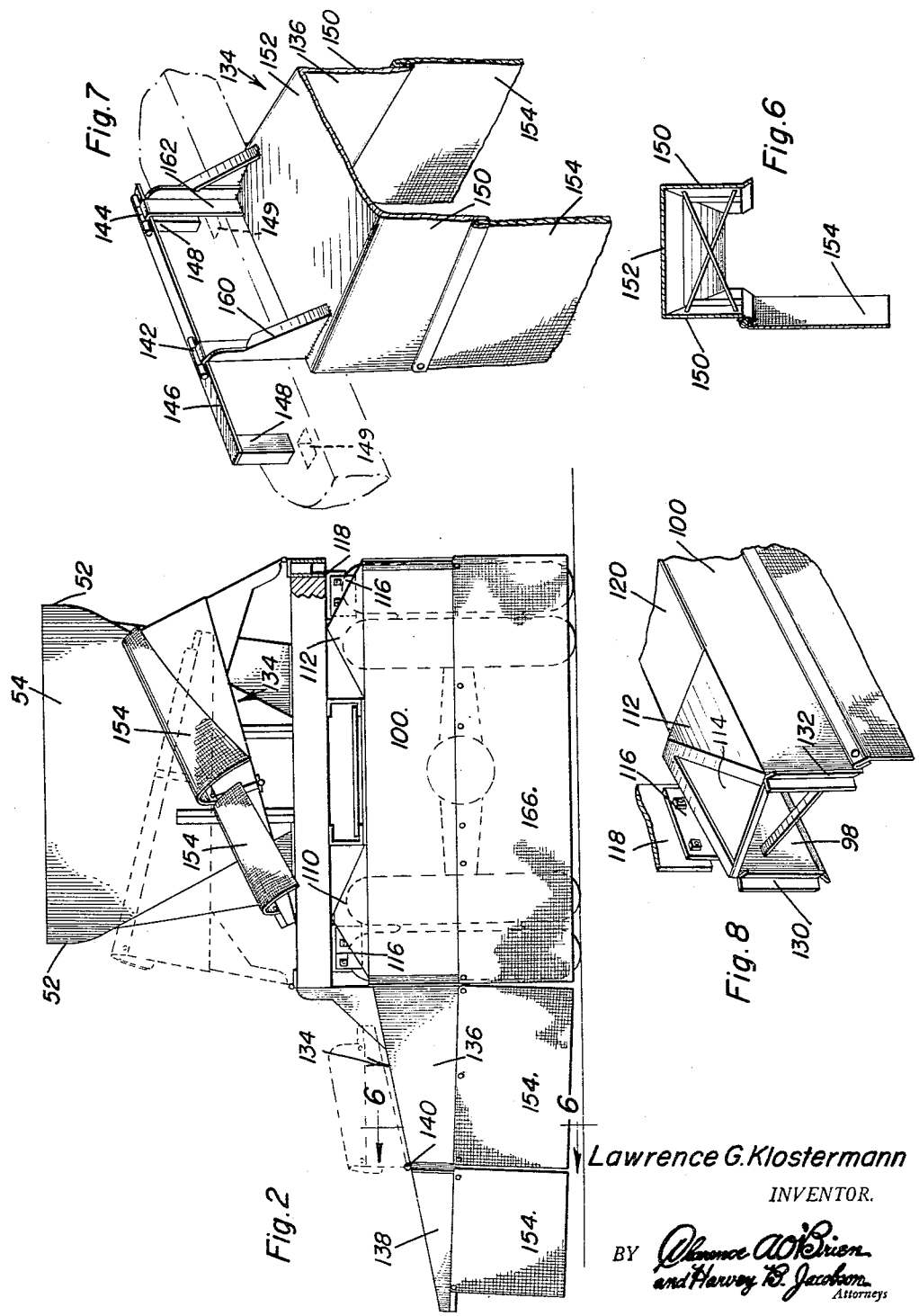
Lawrence G. Klostermann
INVENTOR.

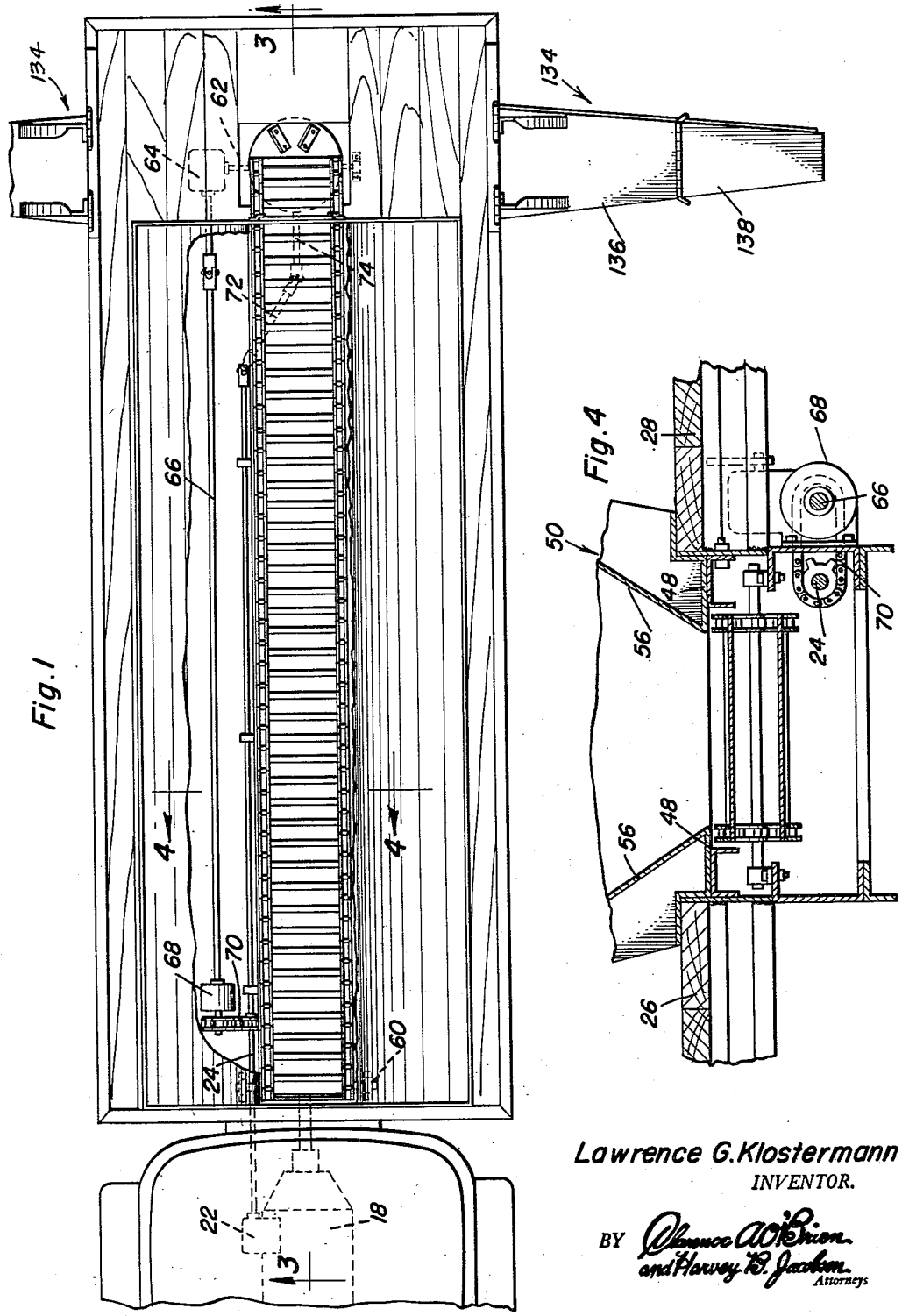
Lawrence G. Klostermann
INVENTOR.

Sept. 10, 1957    L. G. KLOSTERMANN    2,805,863
SPREADER
Filed Sept. 30, 1954    3 Sheets-Sheet 3
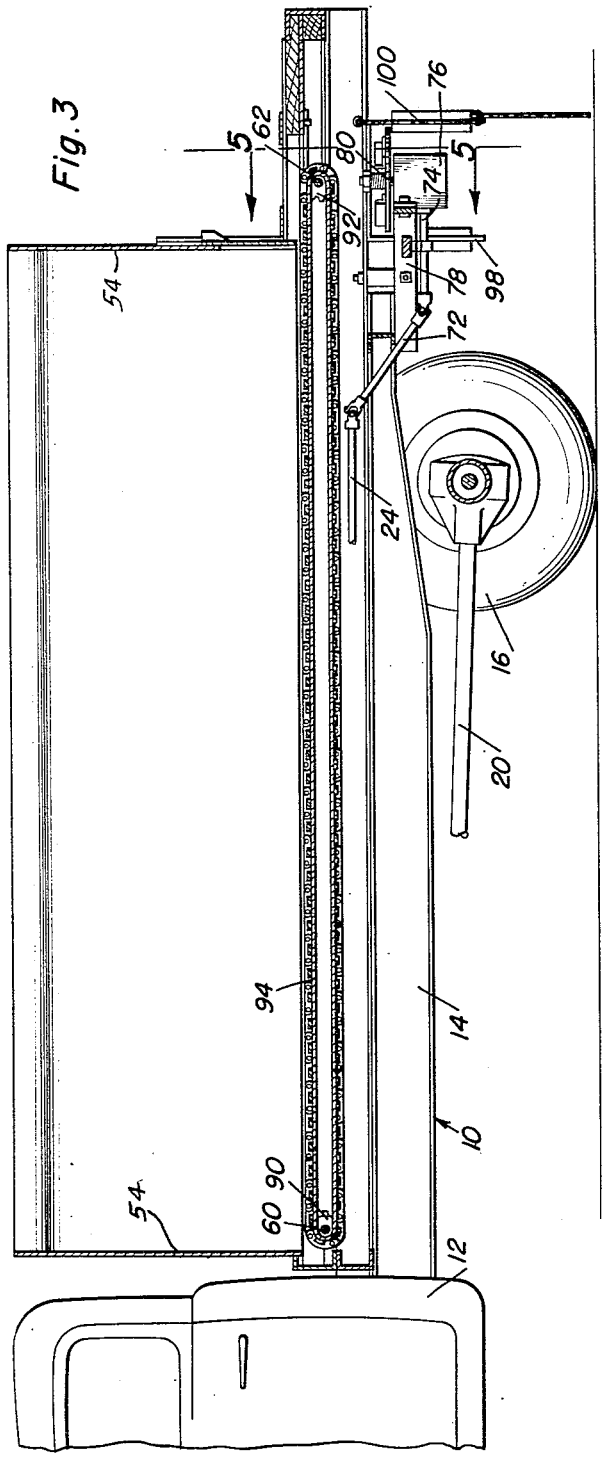
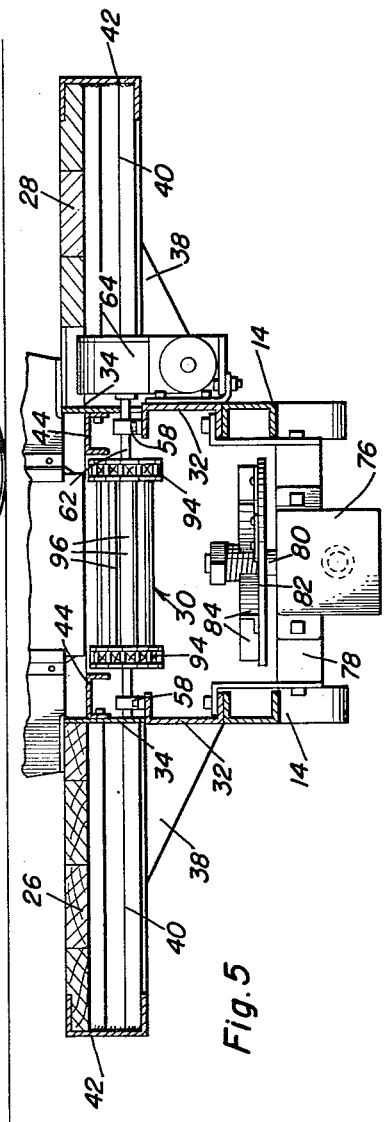
Lawrence G. Klostermann
INVENTOR.

United States Patent Office 2,805,863
Patented Sept. 10, 1957

2,805,863

SPREADER

Lawrence G. Klostermann, Dyersville, Iowa

Application September 30, 1954, Serial No. 459,455

3 Claims. (Cl. 275—2)

This invention relates generally to attachments for vehicles and pertains more particularly to a spreader box attachment therefor for the purpose of spreading powder material such as lime and the like.

Currently, due to the high rate of production necessary to maintain a modern farm, and due to research along agricultural lines, it has been found necessary to supplant the natural restoration of the soil by artificial means. One such means is by spreading powdered lime and the like.

It is therefore a primary object of this invention to provide an attachment for flat bed trucks which will permit the truck to be utilized for the purpose of spreading lime.

Another object of this invention is to provide a spreader box attachment for automotive trucks wherein the amount and speed with which lime may be distributed is greatly increased.

Still another object of this invention is to provide an improved attachment for flat bed trucks in the form of a hopper and an endless conveyor cooperating therewith to distribute lime from the hopper to a rotating spreader disk or plate and, to provide deflector plate and hood means for evenly distributing the lime on the surface of the earth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a truck provided with the improved spreader assembly;

Figure 2 is a rear elevational view of the assembly shown in Figure 1 but with one of the hood extensions in inoperative position;

Figure 3 is a longitudinal section taken substantially along the plane of section line 3—3 of Figure 1;

Figure 4 is an enlarged transverse section taken substantially along the plane of section line 4—4 of Figure 1;

Figure 5 is an enlarged vertical section taken substantially along the plane of section line 5—5 of Figure 3;

Figure 6 is a transverse sectional view taken substantially along the plane of section line 6—6 of Figure 2;

Figure 7 is a partial perspective view showing the manner of mounting the hood extensions; and Figure 8 is a partial perspective view showing the inner construction of the deflector assembly.

Referring now more particularly to the drawings, an automotive truck is indicated generally by the reference character 10 and will be seen to include the cab portion 12, the main rail frame members 14, the rear driving wheels 16, as well as conventional front steering wheel members not shown. The truck has the usual motor transmission assembly 18 associated therewith from which the drive shaft 20 extends for connection drivingly to the rear wheels in a conventional and well known manner.

The transmission includes a power take-off assembly 22 and a power take-off shaft 24 extends therefrom which is under the control of the vehicle operator in the usual and well known manner.

The bed of the truck is so formed that it includes two side portions 26 and 28 which are disposed in spaced relation so as to provide a space therebetween in which the endless conveyor assembly indicated generally by the reference character 30 is mounted.

As will be seen most clearly in Figures 4 and 5, the frame rails 14 have mounted thereon channel members 32 and vertical plate members 34 are rigidly secured thereto. Gusset plates 38 are secured rigidly with the plates 32 and brace and underlie the side portions 26 and 28 of the bed in any desired manner, the particular construction thereof forming no part of this invention.

The bed portions preferably include lateral stringer members 40 which are disposed at longitudinal spaced intervals. Channel iron members 42 are secured in opposite sides of the portions 26 and 28 directly to the stringer members 40 and extend along the entire distance covered by the bed assembly.

Inverted channel iron members 44 are rigidly secured to the inner faces of the plates 34 and provide support for stepped lateral flange portions 48 of a hopper assembly which is indicated generally by the reference character 50. The hopper includes spaced side walls 52, end walls 54 and downwardly converging bottom walls 56. The lower edges of the bottom walls 56 are formed integral with or are rigidly secured to the stepped flanges 48 such that, as will be readily apparent, the channel iron members 44 and adjacent side edge portions of the bed portions 26 and 28 provide a rigid support and positioning means for the hopper assembly.

The upper flanges of the members 32 provide a means for supporting bearing assemblies 58 thereon which journal therebetween a pair of shaft members 60 and 62, the latter of which extends to a gear box assembly 64 which is connected through a shaft 66 to a reduction gear box 68 and thence through a chain connection 70 to the power take-off shaft 24 in the manner shown most clearly in Figure 1. In addition to the chain connection 70 to the reduction box 68, the take-off shaft 24 extends rearwardly therebeyond and is connected to suitable universal joints and an extension 72 to a shaft 74 which extends for connection to a gear box assembly 76 rigidly secured to the frame of the truck by any suitable supporting bracket assembly 78. A vertical drive shaft member 80 extends upwardly from the gear box 76 and has rigidly mounted thereon a spreader disk or plate 82 provided with a series of angle iron members 84 in radial fashion thereon for the purpose of slinging the lime over a wide area as the disk is rotated when the power takeoff shaft is connected with the vehicle engine.

It will be noted that the previously mentioned shafts 60 and 62 support sprocket members 90 and 92 respectively about which endless chains 94 are trained. Between this pair of endless chains are fixed slat members 96, the chains 94 and the slats 96 forming a conveyor assembly. It is to be noted that the top flight of the chains 94 are positioned such that they lie just below the upper surfaces of the inverted channel members 44 such that when the hopper assembly is removed and it is desired to utilize the truck as a flat bed of conventional construction, boards may be laid across the opening between the bed portions 26 and 28 to provide a smooth and flat bed surface of uninterrupted construction.

For the purpose of correctly distributing the lime or material slung from the disk or plate 82, a pair of deflector plates 98 and 100 are disposed on opposite sides, that is, forwardly and rearwardly of the spreader disk 82 in the manner shown most clearly in Figure 3. To help maintain the lime or powdered material to be contained between the plates 98 and 100, upraised inverted catch pan portions 110 and 112 are provided on the plates 98, 100 at opposite sides of the spreader disk and rise above said disk or plate 82, see particularly Figure 2. These catch pans, as will be seen most clearly in Figure 8 are of pyramidal construction and bridge the pairs of deflector plates 98, 100 and have openings 114 on one side thereof facing the disk or plate 82 so as to permit powdered material which is thrown outwardly of the disk or plate 82 to enter the pans 110, 112 and pass therefrom downwardly between the pairs of plates 98, 100. Strap members 116 are secured to the forward edges of the plate portions 98, and depending plate members 118 secured to the undersurface of the vehicle bed serve as mounting brackets for the plates 98, 100 such that the plates are rigidly secured thereto. In this respect, it will be noted that the plates 98 and 100 are interconnected at their upper ends by a cross-plate member 120 in the manner shown.

Opposite ends of the plates 98 and 100 are provided with vertically disposed angle iron members 130 and 132 which form seals with the vertical edges of hood assemblies 134, see particularly Figures 2 and 8.

The hood assemblies 134 include the inner sections 136 and the outer extension sections 138 suitably joined together by a pintle pin member 140 such that the extension 138 is movable to an inoperative position overlying the inner section 136 in the manner most clearly shown in Figure 2. In turn, the inner sections 136 are hingedly secured as by hinge members 142 and 144 to a strap member 146 which is secured to the opposite side edges of the vehicle bed by reception of depending post members 148 in suitable apertures or openings 149 formed in the bed. Each of the inner and outer sections of the hood assemblies includes opposite side walls 150 joined by top wall member 152 and provided along the lower edges of the side walls 150 with depending apron assemblies of flexible material such as canvas or the like as is indicated by the reference character 154.

The side walls of the inner and outer sections 136 and 138 are mutually convergent in a direction laterally of the vehicle bed so that the two hood assemblies are movable into overlying relation resting upon one another and the vehicle bed in a manner illustrated by the full and dotted lines in Figure 2.

Uprights 160 and 162 which are secured to the top walls 152 of the inner sections 136 form a connecting means between the hinges 142 and 144 by means of which the hood assemblies are hingedly secured to the vehicle. Of course, it will be readily apparent that the entire hood assemblies can be rapidly detached from the vehicle by merely removing the posts 148 from their corresponding apertures 149.

The rear deflector plate 100 is also provided with a depending flexible apron 166.

By the construction previously described, it will be readily apparent that as material is conveyed by the conveyor from the hopper onto the spreader disk or plate, the material slung from the plate will be deflected by the plates 98 and 100 and retained within the confines of the hoods to effect an even and wide distribution of the material upon the ground surface both over which the truck is progressing and for a substantial distance on opposite sides thereof. In this manner, more rapid and even distribution of the lime or other powdered material is effected.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A conversion box attachment for vehicles of the type having a flat bed having apertures therein at each side adjacent its rear end, supporting wheels, and a source of power for driving at least some of said wheels, comprising an endless conveyor, said bed having a longitudinal cutaway portion and said conveyor being secured therein, a hopper including a lower lateral step portion extendable into said cutway portion for removably mounting said hopper upon said bed, said hopper having downwardly sloping bottom walls for directing material onto said conveyor, a vertical drive shaft disposed at the rear end of said bed below one end of said conveyor, a spreader disk secured to said drive shaft, means connecting said source of power with said conveyor and said drive shaft for operating the same, a pair of deflector plates secured transversely of and depending from said bed at opposite sides of said spreader disk, a hood at each side of said bed at the rear end thereof having a top wall member and side walls, each of said hoods including a strap transverse to the hood, and uprights secured to said hood at their lower ends and pivoted to the strap at their upper ends for swinging of the hood into nested overlying position relative to said bed or into laterally extending position relative to said bed to form extensions of said deflector plates, each of said hoods being tapered outwardly of said bed in its laterally extending position, each strap having a pair of depending posts engageable in said apertures in the bed and removable therefrom for removing each strap and hood therewith.

2. In an automotive vehicle having a power source, a flat bed having spaced opposite side portions and having apertures therein at each side adjacent its rear end, an endless conveyor disposed between the side portions of the bed, a hopper on said bed having an open bottom defined by sloping bottom walls terminating at their lower edges in closely spaced relation to said conveyor, said hopper having laterally projecting stepped flanges engaged upon the facing edges of said side portions for removably mounting the hopper on said bed, a vertical driveshaft disposed at the rear end of said bed below one end of the conveyor, a spreader disk secured to the drive shaft, means connecting the source of power with said conveyor and said drive shaft for operating the same, a pair of deflector plates secured transversely of and depending from said bed on opposite sides of said spreader disk, a hood at each side of said bed at its rear end having a top wall member and side walls, each of said hoods including a strap transverse to the hood, and uprights, said uprights secured to said hood at their lower ends and pivoted to the strap at their upper ends for swinging of the hood into nested overlying position relative to said bed or into laterally extending relation to said bed to form extensions of said deflector plates, each of said hoods being tapered outwardly of said bed in its laterally extending position, each strap having a pair of depending posts engageable in said apertures in said bed and removable therefrom for removing each strap and hood therewith.

3. In an automotive vehicle have a source of power, a flat bed having spaced opposite side portions forming a cutaway portion and having apertures therein at each side adjacent its rear end, an endless conveyor disposed between said side portions, a hopper including a lower lateral stepped portion extendible into said cutaway portion for removably mounting the hopper on said bed, said hopper having an open bottom defined by downwardly sloping bottom walls terminating at their lower edges in closely spaced relation to said conveyor, said hopper having stepped flanges engaged upon the facing edges of said side portions, a vertical drive shaft at the rear end of said bed below one end of the conveyor, a spreader disk secured to the drive shaft, means connecting the source of power with the conveyor and said drive shaft for operating the same, a pair of deflector plates secured transversely of and depending from said bed at opposite sides of said spreader disk, a hood at each side of said bed at its rear end having a top wall member and side walls, each of said hoods including a strap transverse to the hood, and uprights, said uprights secured to said hood at their lower ends and pivoted to the strap at their upper ends for swinging of the hood into nested overlying position relative to said bed or into laterally extending position relative to said bed to form extensions of said deflector plates, each of said hoods being tapered outwardly of said bed in its laterally extending position, each strap having a pair of depending posts engageable in said apertures in the bed and removable therefrom for removing each strap and hood therewith.

References Cited in the file of this patent

UNITED STATES PATENTS

| | | |
|---|---|---|
| Re. 22,020 | Fulkerson et al. | Feb. 10, 1942 |
| 1,928,859 | Kutscha | Oct. 3, 1933 |
| 2,500,681 | Hoffstetter | Mar. 14, 1950 |

FOREIGN PATENTS

| | | |
|---|---|---|
| 694,198 | Great Britain | July 15, 1953 |